(12) United States Patent
McIntosh

(10) Patent No.: US 6,232,922 B1
(45) Date of Patent: May 15, 2001

(54) PASSIVE THREE DIMENSIONAL TRACK OF NON-COOPERATIVE TARGETS THROUGH OPPORTUNISTIC USE OF GLOBAL POSITIONING SYSTEM (GPS) AND GLONASS SIGNALS

(76) Inventor: John C. McIntosh, 1320 W. Branch Rd., Benson, AZ (US) 85602

(*) Notice: Subject to any disclaimer, the term of this patent is extended or adjusted under 35 U.S.C. 154(b) by 0 days.

(21) Appl. No.: 09/310,808

(22) Filed: May 12, 1999

Related U.S. Application Data

(60) Provisional application No. 60/085,188, filed on May 12, 1998.

(51) Int. Cl.[7] ............................................. G01S 3/02
(52) U.S. Cl. ................................. 342/453; 342/357.06
(58) Field of Search .......................... 342/357.06, 451, 342/453; 455/65

(56) References Cited

U.S. PATENT DOCUMENTS

| | | | |
|---|---|---|---|
| 4,104,629 | * 8/1978 | Isbister et al. | 343/6 R |
| 5,173,690 | * 12/1992 | Friedman et al. | 340/870.1 |
| 5,187,485 | * 2/1993 | Tsui et al. | 342/357 |
| 5,252,980 | * 10/1993 | Gray et al. | 342/59 |
| 5,280,294 | * 1/1994 | Hammerquist | 342/453 |
| 5,546,087 | * 8/1996 | Neira | 342/120 |
| 5,949,364 | * 9/1999 | Katzberg et al. | 342/25 |

* cited by examiner

Primary Examiner—Thomas H. Tarcza
Assistant Examiner—Dao L. Phan
(74) Attorney, Agent, or Firm—Mark Clodfelter

(57) ABSTRACT

A method and apparatus for utilization of GPS, GLONASS or other existing RF signals is disclosed. These existing RF signals are scattered by targets, with a receiver of these scattered signals providing processing to extract three dimensional track of these objects. Angle-of-Arrival (AOA) information of a received signal may be used, but is not required. Modifications of standard GPS signal processing allows observables such as range-sum, range-difference, and bistatic Doppler frequency to be observed. These observables, when coupled with standard bistatic/multistatic location equations, provide unambiguous and even redundant information on target coordinates. The method/device employs a modified code (range)/carrier(Doppler) search routine for initial target search/acquisition, wherein a direct path signal is used as a reference from which chip delay and Doppler shift excursions are examined. In this manner, the range and Doppler components observed will correspond to [range-sum−direct path] range, and true bistatic target Doppler irrespective of the satellite or receiver induced Doppler shifts.

11 Claims, 22 Drawing Sheets

Range Sums $(x_i, x_j, 0) = j$th-site location, $j = 0, 1, 2, 3$ $(x_0, x_0, 0) = (0, 0, 0)$ $d_j^2 = x_j^2 + y_j^2 \qquad r_j = +\sqrt{(x - x_j)^2 + (y - y_j)^2 + z^2}$ $S_j = \rho - r_j$, where $\rho = +\sqrt{x^2 + y^2 + z^2}$ $$x = \frac{(d_1^2 - S_1^2)(y_3S_2 - y_2S_3) + (d_2^2 - S_2^2)(y_1S_3 - y_3S_1) + (d_3^2 - S_3^2)(y_2S_1 - y_1S_2)}{2[x_1(y_3S_2 - y_2S_3) + x_2(y_1S_3 - y_3S_1) + x_3(y_2S_1 - y_1S_2)]}$$

$$y = \frac{(d_1^2 - S_1^2)(x_2S_3 - x_3S_2) + (d_2^2 - S_2^2)(x_3S_1 - x_1S_3) + (d_3^2 - S_3^2)(x_1S_2 - x_2S_1)}{2[y_1(x_2S_3 - x_3S_2) + y_2(x_3S_1 - x_1S_3) + y_3(x_1S_2 - x_2S_1)]}$$

$$\rho = \frac{(d_1^2 - S_1^2)(x_2y_3 - x_3y_2) + (d_2^2 - S_2^2)(x_3y_1 - x_1y_3) + (d_3^2 - S_3^2)(x_1y_2 - x_2y_1)}{-2[S_1(x_2y_3 - x_3y_2) + S_2(x_3y_1 - x_1y_3) + S_3(x_1y_2 - x_2y_1)]}$$

$z = \pm\sqrt{\rho^2 - x^2 - y^2}$

Figure 7a

| Doppler |
|---|

(1) $\begin{vmatrix} P_{12}^2 - d_2^2 & P_{12} & x_2 & y_2 & z_2 \\ P_{13}^2 - d_3^2 & P_{13} & x_3 & y_3 & z_3 \\ P_{14}^2 - d_4^2 & P_{14} & x_4 & y_4 & z_4 \\ P_{15}^2 - d_5^2 & P_{15} & x_5 & y_5 & z_5 \\ P_{16}^2 - d_6^2 & P_{16} & x_6 & y_6 & z_6 \end{vmatrix} = 0$ (2) $\begin{vmatrix} (P_{12} + \Delta_{12}^i)^2 - d_2^2 & P_{12} + \Delta_{12}^i & x_2 & y_2 & z_2 \\ (P_{13} + \Delta_{13}^i)^2 - d_3^2 & P_{13} + \Delta_{13}^i & x_3 & y_3 & z_3 \\ (P_{14} + \Delta_{14}^i)^2 - d_4^2 & P_{14} + \Delta_{14}^i & x_4 & y_4 & z_4 \\ (P_{15} + \Delta_{15}^i)^2 - d_5^2 & P_{15} + \Delta_{15}^i & x_5 & y_5 & z_5 \\ (P_{16} + \Delta_{16}^i)^2 - d_6^2 & P_{16} + \Delta_{16}^i & x_6 & y_6 & z_6 \end{vmatrix} = 0$ where $i = 1, 2, \ldots, 20$.

Subtracting Equation (1) from (2) yields 20 equations in 20 variables.

$J_1 + J_2 = J$, where $J_1$ is the number of transmitter sites and $J_2$ the number of receiving sites (these can be interchanged but $J_1 \square J_2$).

$(x_j, y_j, z_j)$ = $j$th-site location. $r_j^i$ = distance from $j$th site on $i$th observation.

$r_j^0 = r_j$.

$P_{jk}^i = r^i + r_k^i$.

$P_{jk}^0 = P_{jk}$ $\Delta_{jk}^i = P_{jk}^i + P_{jk}$ $I$ = number of time intervals.

$m = 3(I + 1)$ = number of position bariables.

$P = IJ_1J_2$ = number of observed range increments.

$q = P - m$ = measure of redundancy.

Figure 7b

Range Sums $(x_j, x_j, 0) = j\text{th-site location}, j = 0, 1, 2, 3$ $(x_0, x_0, 0) = (0, 0, 0)$ $d_j^2 = x_j^2 + y_j^2 \qquad r_j = +\sqrt{(x - x_j)^2 + (y - y_j)^2 + z^2}$ $S_j = \rho - r_j$, where $\rho = +\sqrt{x^2 + y^2 + z^2}$ $$x = \frac{(d_1^2 - S_1^2)(y_3 S_2 - y_2 S_3) + (d_2^2 - S_2^2)(y_1 S_3 - y_3 S_1) + (d_3^2 - S_3^2)(y_2 S_1 - y_1 S_2)}{2[x_1(y_3 S_2 - y_2 S_3) + x_2(y_1 S_3 - y_3 S_1) + x_3(y_2 S_1 - y_1 S_2)]}$$

$$y = \frac{(d_1^2 - S_1^2)(x_2 S_3 - x_3 S_2) + (d_2^2 - S_2^2)(x_3 S_1 - x_1 S_3) + (d_3^2 - S_3^2)(x_1 S_2 - x_2 S_1)}{2[y_1(x_2 S_3 - x_3 S_2) + y_2(x_3 S_1 - x_1 S_3) + y_3(x_1 S_2 - x_2 S_1)]}$$

$$\rho = \frac{(d_1^2 - S_1^2)(x_2 y_3 - x_3 y_2) + (d_2^2 - S_2^2)(x_3 y_1 - x_1 y_3) + (d_3^2 - S_3^2)(x_1 y_2 - x_2 y_1)}{-2[S_1(x_2 y_3 - x_3 y_2) + S_2(x_3 y_1 - x_1 y_3) + S_3(x_1 y_2 - x_2 y_1)]}$$

$z = \pm\sqrt{\rho^2 - x^2 - y^2}$

Figure 8a

| Doppler | | | | | |
|---|---|---|---|---|---|
| (1) | $\begin{vmatrix} P_{12}^2 - d_2^2 & P_{12} & x_2 & y_2 & z_2 \\ P_{13}^2 - d_3^2 & P_{13} & x_3 & y_3 & z_3 \\ P_{14}^2 - d_4^2 & P_{14} & x_4 & y_4 & z_4 \\ P_{15}^2 - d_5^2 & P_{15} & x_5 & y_5 & z_5 \\ P_{16}^2 - d_6^2 & P_{16} & x_6 & y_6 & z_6 \end{vmatrix} = 0$ | | | | | |
| (2) | $\begin{vmatrix} (P_{12} + \Delta_{12}^i)^2 - d_2^2 & P_{12} + \Delta_{12}^i & x_2 & y_2 & z_2 \\ (P_{13} + \Delta_{13}^i)^2 - d_3^2 & P_{13} + \Delta_{13}^i & x_3 & y_3 & z_3 \\ (P_{14} + \Delta_{14}^i)^2 - d_4^2 & P_{14} + \Delta_{14}^i & x_4 & y_4 & z_4 \\ (P_{15} + \Delta_{15}^i)^2 - d_5^2 & P_{15} + \Delta_{15}^i & x_5 & y_5 & z_5 \\ (P_{16} + \Delta_{16}^i)^2 - d_6^2 & P_{16} + \Delta_{16}^i & x_6 & y_6 & z_6 \end{vmatrix} = 0$ | | | | | | where $i = 1, 2, \ldots, 20$.

Subtracting Equation (1) from (2) yields 20 equations in 20 variables. $J_1 + J_2 = J$, where $J_1$ is the number of transmitter sites and $J_2$ the number of receiving sites (these can be interchanged but $J_1 \square J_2$).

$(x_j, y_j, z_j)$ = $j$th-site location. $r_j^i$ = distance from $j$th site on $i$th observation.

$r_j^0 = r_j$.

$P_{jk}^i = r^i + r_k^i$.

$P_{jk}^0 = P_{jk}$ $\Delta_{jk}^i = P_{jk}^i + P_{jk}$

I = number of time intervals.

$m = 3(I + 1)$ = number of position bariables.

$P = IJ_1J_2$ = number of observed range increments.

$q = P - m$ = measure of redundancy.

Figure 8b

Range Differences $(x_i, x_j, 0) = j$th-site location, $j = 0, 1, 2, 3$ $(x_0, x_0, 0) = (0, 0, 0)$ $d_j^2 = x_j^2 + y_j^2 \qquad r_j = +\sqrt{(x - x_j)^2 + (y - y_j)^2 + z^2}$ $\Delta_j = \rho - r_j$, where $\rho = +\sqrt{x^2 + y^2 + z^2}$ $$x = \frac{(d_1^2 - \Delta_1^2)(y_3\Delta_2 - y_2\Delta_3) + (d_2^2 - \Delta_2^2)(y_1\Delta_3 - y_3\Delta_1) + (d_3^2 - \Delta_3^2)(y_2\Delta_1 - y_1\Delta_2)}{2[x_1(y_3\Delta_2 - y_2\Delta_3) + x_2(y_1\Delta_3 - y_3\Delta_1) + x_3(y_2\Delta_1 - y_1\Delta_2)]}$$

$$y = \frac{(d_1^2 - \Delta_1^2)(x_2\Delta_3 - x_3\Delta_2) + (d_2^2 - \Delta_2^2)(x_3\Delta_1 - x_1\Delta_3) + (d_3^2 - \Delta_3^2)(x_1\Delta_2 - x_2\Delta_1)}{2[y_1(x_2\Delta_3 - x_3\Delta_2) + y_2(x_3\Delta_1 - x_1\Delta_3) + y_3(x_1\Delta_2 - x_2\Delta_1)]}$$

$$\rho = \frac{(d_1^2 - \Delta_1^2)(x_2y_3 - x_3y_2) + (d_2^2 - \Delta_2^2)(x_3y_1 - x_1y_3) + (d_3^2 - \Delta_3^2)(x_1y_2 - x_2y_1)}{-2[\Delta_1(x_2y_3 - x_3y_2) + \Delta_2(x_3y_1 - x_1y_3) + \Delta_3(x_1y_2 - x_2y_1)]}$$

$z = \pm\sqrt{\rho^2 - x^2 - y^2}$

Figure 8c

For the following equations, the receiver sites are located at ±a on the x axis.
$\theta_i$ is the azimuth angle as measured counter-clockwise from the x axis from site $i$ to the target.
$\phi_i$ is the elevation angle from site $i$ to the target.

$\theta_1, \phi_1, r_1 + r_2 = s$ $$x = \frac{(s/2)(2a/s - \cos\phi_1 \cos\theta_1)}{(2a/s)\cos\phi_1 \cos\theta_1 - 1}$$

$$y = \frac{(s/2)(4a^2/s^2 - 1)\cos\phi_1 \sin\theta_1}{(2a/s)\cos\phi_1 \cos\theta_1 - 1}$$

$$\rho = \frac{(s/2)(4a^2/s^2 - 1)\sin\phi_1}{(2a/s)\cos\phi_1 \cos\theta_1 - 1}$$

$\theta_1, \theta_2, \phi_1, r_1 + r_2 = s$ $$x = \frac{a\sin(\theta_1 + \theta_2)}{\sin(\theta_2 - \theta_1)}$$

$$y = \frac{2a\sin\theta_1 \sin\theta_2}{\sin(\theta_2 - \theta_1)}$$

$$z = \frac{2a\sin\theta_2}{\sin(\theta_2 - \theta_1)} \tan\phi_1 \qquad \phi_1 = 90° \Rightarrow \text{no solution}$$

$$z = \pm\frac{1}{2s}\sqrt{(4a^2 - s^2)(4x^2 - s^2) - y^2}$$

Figure 10a $\theta_1, \theta_2, r_1 + r_2 = s$ $$x = \frac{a \sin(\theta_1 + \theta_2)}{\sin(\theta_2 - \theta_1)}$$

$$y = \frac{2a \sin\theta_1 \sin\theta_2}{\sin(\theta_2 - \theta_1)}$$

$$z = \pm \frac{1}{2s} \sqrt{(4a^2 - s^2)(4x^2 - s^2) - y^2}$$

$\theta_1, \theta_2, \phi_1, \phi_2$ $$x = \frac{a \sin(\theta_1 + \theta_2)}{\sin(\theta_2 - \theta_1)}$$

$$y = \frac{2a \sin\theta_1 \sin\theta_2}{\sin(\theta_2 - \theta_1)}$$

$$z = \frac{2a \sin\theta_2}{\sin(\theta_2 - \theta_1)} \tan\phi_1 \qquad \phi_1 = 90° \Rightarrow \text{no solution}$$

$$z = \frac{2a \sin\theta_1}{\sin(\theta_2 - \theta_1)} \tan\phi_2$$

Figure 10b $\theta_1, \theta_2, \phi_1$ $$x = \frac{a \sin(\theta_1 + \theta_2)}{\sin(\theta_2 - \theta_1)}$$

$$y = \frac{2a \sin\theta_1 \sin\theta_2}{\sin(\theta_2 - \theta_1)}$$

$$z = \frac{2a \sin\theta_2}{\sin(\theta_2 - \theta_1)} \tan\phi_1$$

$\phi_1 = 90° \Rightarrow$ no solution $\theta_1, \theta_3, \phi_3$ $$x = \frac{b - a \tan\theta_1}{\tan\theta_1 + \cot\theta_3}$$

$$y = b - x \cot\theta_3$$

$$z = \sqrt{x^2 + (y - b)^2} \, \tan\phi_3$$

$\phi_3 = 90° \Rightarrow$ no solution

Figure 10c

| $\theta_1, \theta_2, \theta_3, \phi_1, \phi_2, \phi_3$ | | |
|---|---|---|
| | $x = \dfrac{a \sin(\theta_1 + \theta_2)}{\sin(\theta_2 - \theta_1)}$ | |
| | $y = \dfrac{2a \sin\theta_1 \sin\theta_2}{\sin(\theta_2 - \theta_1)}$ | |
| | $z = \dfrac{2a \sin\theta_2}{\sin(\theta_2 - \theta_1)} \tan\phi_1$ | $\phi_1 = 90° \Rightarrow$ no solution |
| | $z = \dfrac{2a \sin\theta_1}{\sin(\theta_2 - \theta_1)} \tan\phi_2$ | |
| | $x = \dfrac{b - a \tan\theta_1}{\tan\theta_1 + \cot\theta_3}$ | |
| | $y = b - x \cot\theta_3$ | |
| | $z = \sqrt{x^2 + (y - b)^2}\, \tan\phi_3$ | $\phi_3 = 90° \Rightarrow$ no solution |
| | $x = \dfrac{b + a \tan\theta_2}{\tan\theta_1 + \cot\theta_3}$ | |

Figure 10d

PASSIVE THREE DIMENSIONAL TRACK OF NON-COOPERATIVE TARGETS THROUGH OPPORTUNISTIC USE OF GLOBAL POSITIONING SYSTEM (GPS) AND GLONASS SIGNALS

This application claim benefit to Provisional Application 60/085,188 filed May 12, 1998.

ORIGIN OF THE INVENTION

This invention was made with government support under contract number DASG60-97-M-0139. As such, the United States government has certain rights in the invention.

FIELD OF THE INVENTION

The present invention relates generally to passive radar detectors, and particularly to such a detector wherein objects of interest in night or on the ground scatter RF energy from GPS, GLONASS or other RF sources, the scattered energy received and processed to determine coordinates of the object of interest.

BACKGROUND OF THE INVENTION

The invention herein described provides modification of a conventional GPS receiver to provide accurate and timely location information on objects not colocated with the GPS receiver. For general background purposes, there are two sources which are recommended: 1) "Understanding GPS Principles and Applications" by Elliot Kaplan, Artech House, 1996, and 2) "Bistatic Radar", by Nicholas Willis, Artech House, 1991.

There are myriad patents relating to use of GPS to find location, attitude, velocity, etc., of platforms upon which GPS sensors are mounted, for example patents: U.S. Pat. Nos. [5,043,736] [4,894,662] [4,870,422] [4,797,677]. All of these systems utilize a GPS direct path signal (a signal which proceeds directly from each GPS satellite to the GPS receiver) in order to determine position of the GPS receiver via multi-lateration.

The GPS signals include at least one carrier signal, which may be at a frequency of around 1 gHz or so, with a known pseudorandom noise sequence (PRN) and a message signal impressed on the carrier signal. The PRN sequence from several satellites (in the GPS system at least 4) is used to determine exact time of transmission of signals from any satellite, while the message signal carries ephemeris (satellite position) and other information. The PRN sequence, in the C/A (civilian) version of GPS is a free-running PRN sequence that repeats every 1 millisecond or so, greatly facilitating a receiver's ability to lock onto the signal. Additionally, in the C/A version, the PRN code has a baud rate of about 1 mHz or so. The message code impressed on the PRN sequence is slow, with a baud rate of about 50 Hz or so. In contrast, in the military version of GPS, the PRN code is encoded, and if left in a free-running state, would take almost a year to repeat. As a practical matter, the code is reset every week or so. Also, the P(Y) military baud rate is about 10 mHz, an order of magnitude higher than the C/A codes.

In standard GPS and GLONASS concepts, receiver position is refined by successive determinations of range from multiple GPS or GLONASS satellites. For example, determination of range of a receiver from a single GPS satellite (S1), will narrow receiver position uncertainty down to the surface of a sphere of radius R1 (with some thickness which relates to the pseudorange accuracy), the sphere centered on the satellite location (known via ephemeris data). Determination of range (R2) of the same receiver to another satellite (S2) will result in further refinement of receiver position, within limits of the pseudorange accuracy, to an intersection of the two spheres of radius R1 and R2 centered on satellites S1 and S2, respectively. By extending this geometric location approach to include additional satellites, conventional GPS receivers provide receiver location via pseudorange when ranges to four or more satellites are known (three satellites are required for location, but an additional satellite signal is required for time correction). The present invention uses a GPS, GLONASS or possibly other RF source multipath signal scattered from objects of interest to determine [x,y,z] coordinates of these objects with respect to position of a receiver modified in accordance with the instant invention Using relatively long integration times (in excess of 20 ms) of data bit changes of the PRN code, which are implemented by phase shifts, the use of data wipeoff is required, which will be explained further hereinafter, to correct for phase shifts of the message signal in the PRN sequence, but results in a viable Signal to Noise Ratio (SNR) for targets at ranges of interest. This search technique increases SNR in two ways: 1) through signal processing gain induced by coherent chip integration of correlators involved with signal processing gain, and 2) through reduction of noise bandwidth due to pre-detection bandwidth being approximately equal to the reciprocal of integration time. This search strategy can be processing intensive if carried out over many range/Doppler bins, but is easily amenable to parallel processing. Once range/Doppler search has been achieved over the desired velocity/range interval, range/Doppler bins may be compared to a threshold determined by statistical detection to achieve a given probability of detection and false alarm rate. Range/Doppler bins achieving detection can then be placed in search loops (PRN sequence and carrier) analogous to those currently used in standard GPS receivers in order to achieve and maintain lock on direct path GPS signals. Since integration times longer than those employed in a standard GPS receiver will be necessary in order to detect and track indirect path targets, track update rate will be lower than desirable. Track update rate may be artificially increased at the expense of further parallel processing and memory, wherein a sliding integration window is used to maintain track with a constant and relatively long integration time while maintaining a short update rate.

The following two patents, which may be relevant to Applicant's disclosure, discuss uses of scattered GPS signals: U.S. Pat. No. 5,546,087 by Neira, M. M., and U.S. Pat. No. 5,187,485 by Tsui et al. The Neira patent utilizes the multipath signal scattered from the ground coupled with a theoretical model of the terrestrial sphere in order to provide precise altimetry measurements. The method used in the Neira patent is intrinsically based upon the assumption that the target of interest resides on the Earth's surface, a constraint not needed in the instant invention. The Tsui patent seeks to passively determine range to targets via use of scattered GPS signals. While solutions are postulated for target three dimensional coordinates in the Tsui patent, there is an inherent constraint that angle of arrival (AOA) of a multipath signal from a target to a receiving station must be known. In the present invention, the AOA information may be used, but is not required for a three dimensional solution to fix target position.

SUMMARY OF THE PRESENT INVENTION

A method for utilizing existing or ambient RF signals, such as location signals from a satellite, to develop data related to a selected relationship between a receiving station and a target is disclosed. An existing RF signal is received and split into two paths. In a first path, direct range data from signals taking a direct signal path between a transmitter of the RF signals and a receiving station is obtained, and in a second path indirect range data from signals taking a path to the target and then to the receiving station is obtained. The direct range data and indirect range data are compared, and data related to at least one selected relationship between a receiving station and the target is obtained.

BRIEF DESCRIPTION OF THE DRAWINGS

FIGS. 7a and 7b show a series of equations for solving target coordinates.

FIGS. 8a, 8b and 8c show a series of equations for providing tracking and coordinate information.

FIGS. 10a, 10b, 10c and 10d show equations for providing angular location information.

DETAILED DESCRIPTION OF THE PREFERRED EMBODIMENT

Figure 1:
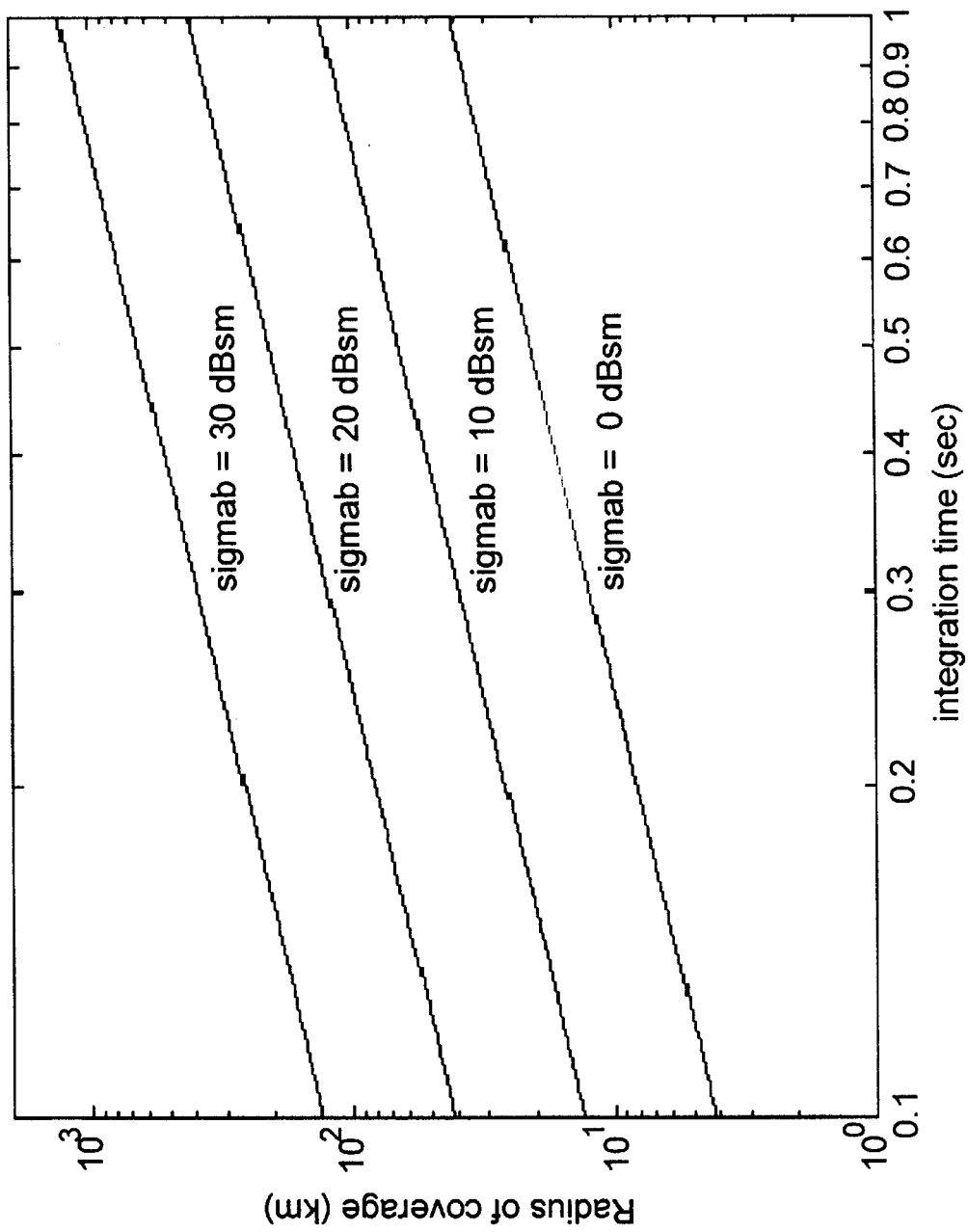
FIG. 1 shows estimated detection ranges for the preferred embodiment versus target RCS and integration time (where sigmab in the figure is the target bistatic radar cross section).

It has been known in the art for some time that three dimensional track of an object based on a bistatic or multistatic architecture can have certain advantages. Since a receiver in the present invention is not colocated with a transmitter, a forward deployment of a discrete receiver to achieve a passive surveillance area centered on the receiver is made possible. In a military context, this would increase a forward surveillance area in both a covert and survivable manner. Additionally, through use of a bistatic architecture wherein a target of interest is located in close proximity to a direct line between a transmitter (in the present invention the GPS satellite) and a receiver, a radar cross section (RCS) of a target so aligned undergoes an augmentation. It is well known in the art that this forward scatter RCS is related to area of the target projected into a plane orthogonal to the transmitter/receiver line of sight such that the RCS is given by:

$$\sigma = 4\Pi A^2/\lambda^2$$

where $\sigma$ is forward scatter RCS, A is target projected area, and $\lambda$ is a wavelength of illuminating electromagnetic energy. It is further well known that this forward scatter RCS is independent of scattering properties of materials which comprise a target of interest, meaning that conventional methods of lowering target RCS through radar absorbing material (RAM) is ineffectual, at least in a forward scatter case. Forward scatter augmentation may be very large, and may result in large detection ranges with even modest transmitter energy. In other words, stealth technology is ineffective in such a forward scattering context of the present invention.

ICD-GPS-200 specifies the GPS received signal power levels. The specified power levels are based on a linearly polarized antenna with 3-dB gain, however, since the GPS satellites transmit right hand circular (RHC) polarization signals, there is some adjustment to be made. Table 1 goes through the adjustment process for each of the signals.

TABLE 1

GPS SPECIFIED MINIMUM RECEIVED SIGNAL POWER

| PARAMETER | L1 C/A CODE | L1 P(Y) CODE | L2 P(Y) OR C/A CODE |
|---|---|---|---|
| User min received power at 3-db gain linearly polarized antenna (dBw) | −160.0 | −163.0 | −166.0 |
| Adjustments for unity gain antenna (dB) | −3.0 | −3.0 | −3.0 |
| Adjustment for typical RHCP antenna vs. linearly polarized antenna (dB) | 3.4 | 3.4 | 3.8 |
| User min received power at unity gain RHCP antenna (dBw) | −159.6 | −162.6 | −165.2 |

The derivation of the GPS ERP for each signal is shown in Table 2. It should be noted here that these derivations do not take into account the stated 3.5 dB link margin (the actual measured link margin at the specified edge of Earth for the L1 signal is typically 3.5 dB as stated by the joint program office on their webpage) which currently exists, and thus the derivation may be considered conservative.

TABLE 2

GPS ERP

| PARAMETER | L1 P CODE | L1 C/A CODE | L2 |
|---|---|---|---|
| User's min received power (dBw) | −163.0 | −160.0 | −166.0 |
| User's linear antenna gain (dB) | 3.0 | 3.0 | 3.0 |
| Free space propagation loss (dB) | 184.4 | 184.4 | 182.3 |

TABLE 2-continued

GPS ERP

| PARAMETER | L1 P CODE | L1 C/A CODE | L2 |
|---|---|---|---|
| Total atmospheric (dB) | 2.0 | 2.0 | 2.0 |
| Polarization mismatch loss (dB) | 3.4 | 3.4 | 4.4 |
| Required satellite ERP (dBw) | 23.8 | 26.8 | 19.7 |

The two numbers of interest are those signals transmitted on L1, i.e. both the P-code and C/A code.

We now turn to the utilization of these ERP for the calculation of corresponding multistatic coverage. The bistatic equations of interest are given in the Willis's "Bistatic Radar" and shown below;

$$K = P_T G_T G_R \lambda^2 \sigma_B F_T F_R G_{proc}/(4\Pi)^3 kT_0 B_n F_n L_T L_R \quad (1)$$

$$k = (K/(SN)_{min})^{1/2} \quad (2)$$

where, $T_S$ has been replaced with $T_0 F_n$ in equation (1), the $G_{proc}$ term has been added to account for the gain out of the receiver correlators, and equation (2) has been rearranged to solve for k. The parameters which will be used in these equations are shown in Table 3.

TABLE 3

PARAMETERS

| PARAMETER | VALUE | UNITS | DESCRIPTION |
|---|---|---|---|
| P G (GPS satellite ERP) | L1 C/A 26.8 L1 P(Y) 23.8 | dsw | Transmitter ERP |
| G | 1 | dBi | receiver ant. gain |
| λ | 0.0351 | m | wavelength squared |
| F F | 1 | dimensionless | antenna pattern propagation factors |
| σ | variable | dBsm | target bistatic radar cross section |
| kT | 4 × 10⁻²¹ | watts/Hz | noise density |
| B | dependent on prediction integration time l/t | Hz | noise bandwidth |
| Fn | 3.5 | dB | noise figure |
| L R | 3.0 | dB | xmitr/recvr losses |
| G | C/A code = t 1.023 × 10⁶ | t is in sec, is dimensional | coherent processing gain |
| (S/N) | 13 | dB | minimum signal to noise ratio required for detection |

For multistatic GPS transmitter/receiver geometry (L±2 √k) where k is defined in equation (2) and L is a baseline between a transmitter and receiver (20,000, to 24,000 km), there are two regions of interest. These regions are composed of ovals of Cassini surrounding the transmitter and receiver in which SNRs will be sufficient for detections to take place. For this geometry case, an equation for a total area covered by combined areas of the transmitter and receiver centered ovals is;

$$A = 2\Pi k^2/L^2 [1 + (\tfrac{1}{3})(16k^2/L^4) + (3^2/(2^4 \cdot 3! \ast 2!))(16k^2/L^4)^2 + \ldots ] \quad (3)$$

If only a first term of this series is taken, then $$A = 2\Pi k^3/L^2 \quad (4)$$

Since equations (3) and (4) include both transmitter (i.e. GPS satellite) and receiver centered ovals (which are being approximated by circles in equation (4), then equation (4) should be divided by two in order to obtain only a coverage area around the receiver.

$$A \approx \Pi k^2/L^2 \quad (5)$$

Coverage area around the receiver may then be approximated as a circle of radius of k/L. So the coverage radius used to quantify detection range for a single GPS receiver in the GPS multistatic system is characterized by k/L. The process of calculating the detection range for a single GPS receiver site then, consists of using the parameters provided in Table 3, to calculate (using equations (1) and (2), K and k. Then the detection range may be directly calculated by;

Detection range≈k/L

Some calculated detection ranges are shown in FIG. 1. In this figure, sigmab represents the target bistatic radar cross section.

Figure 2:
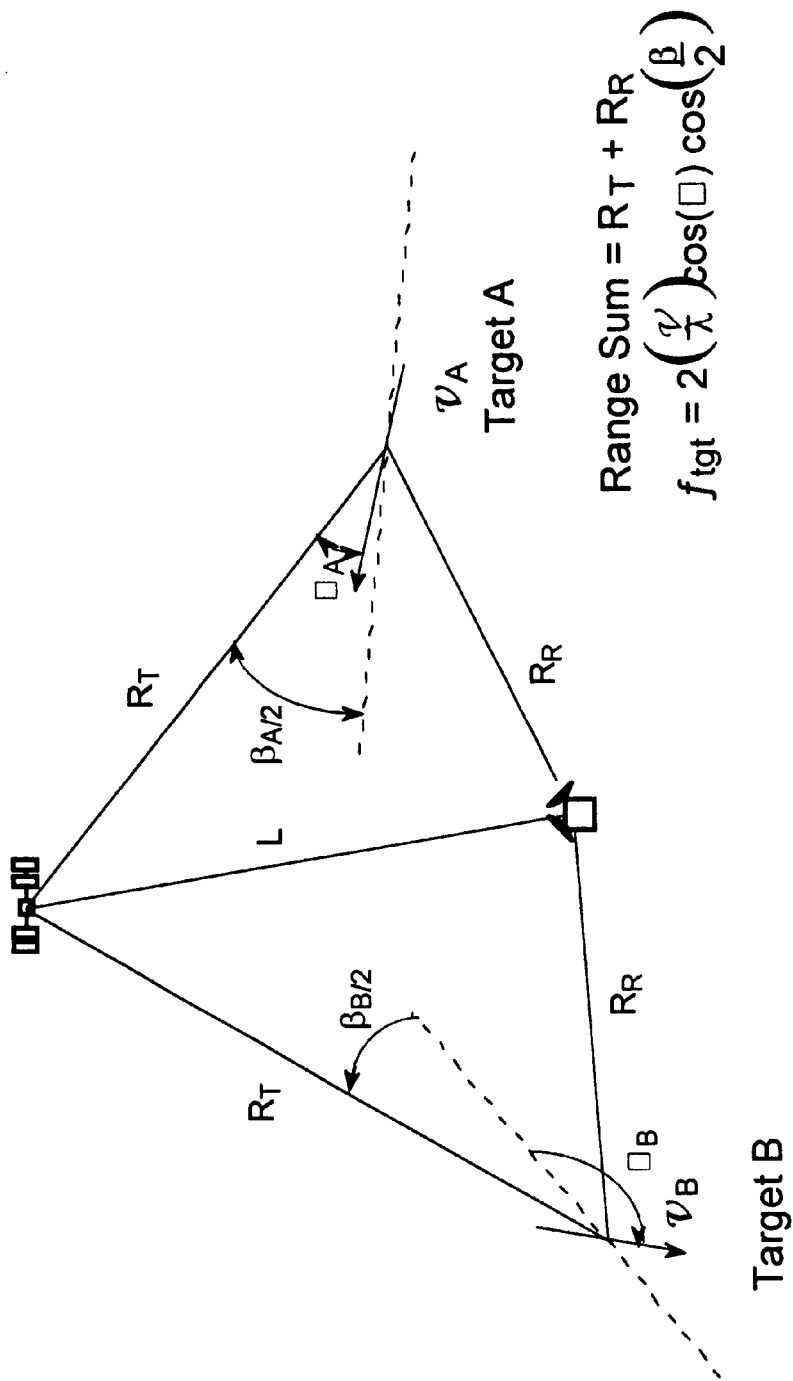
FIG. 2 shows the basic bistatic geometry along with the definition of range-sum and target Doppler.

In order to achieve significant detection ranges for targets of interest without use of highly directive antennae, search/track functions carried out by the present invention are somewhat different in operation from analogous functions carried out in currently existing high power monostatic radar systems. Search functions carried out by receivers as described herein function as a two dimensional search of range-sum, target bistatic Doppler, as shown in FIG. 2. The GPS/GLONASS satellite acts as a transmitter, illuminating a target which is located $R_t$ kilometers from the satellite. The target in turn reflects a certain proportion (determined by the target's bistatic RCS) of incident energy toward a receiver, which is located $R_R$ kilometers from the target. Range-sum is defined as a sum of transmitter to target and target to receiver distance. The bistatic plane is defined as a plane containing the transmitter, target and receiver. Target Doppler is geometrically dependent on the orientation of the target's velocity vector with respect to the bistatic angle (the angle between vectors $R_T$ and $R_R$). The angle δ is defined as the angle between the target velocity vector and the bistatic bisector (β/2), the Doppler sit being at maximum magnitude when the target velocity is parallel or contra-parallel to the bistatic bisector.

Each transmitter (GPS satellite/receiver/target) combination will yield a separate bistatic plane, in which the observed range-sum and Doppler are contained. When a target range-sum is known from a single satellite, uncertainty in target location will be on a finite thickness (determined by track accuracy) ellipsoidal surface. Use of multi-lateration to locate targets is thus similar in principle to that used for conventional GPS receivers to provide receiver location, except in the present invention, target position (rather than receiver position) is refined by successive determination of range-sum of a target from multiple satellites. Target position location is then geometrically composed of an intersection of uncertainty ellipsoids rather than spheres.

Figure 3:
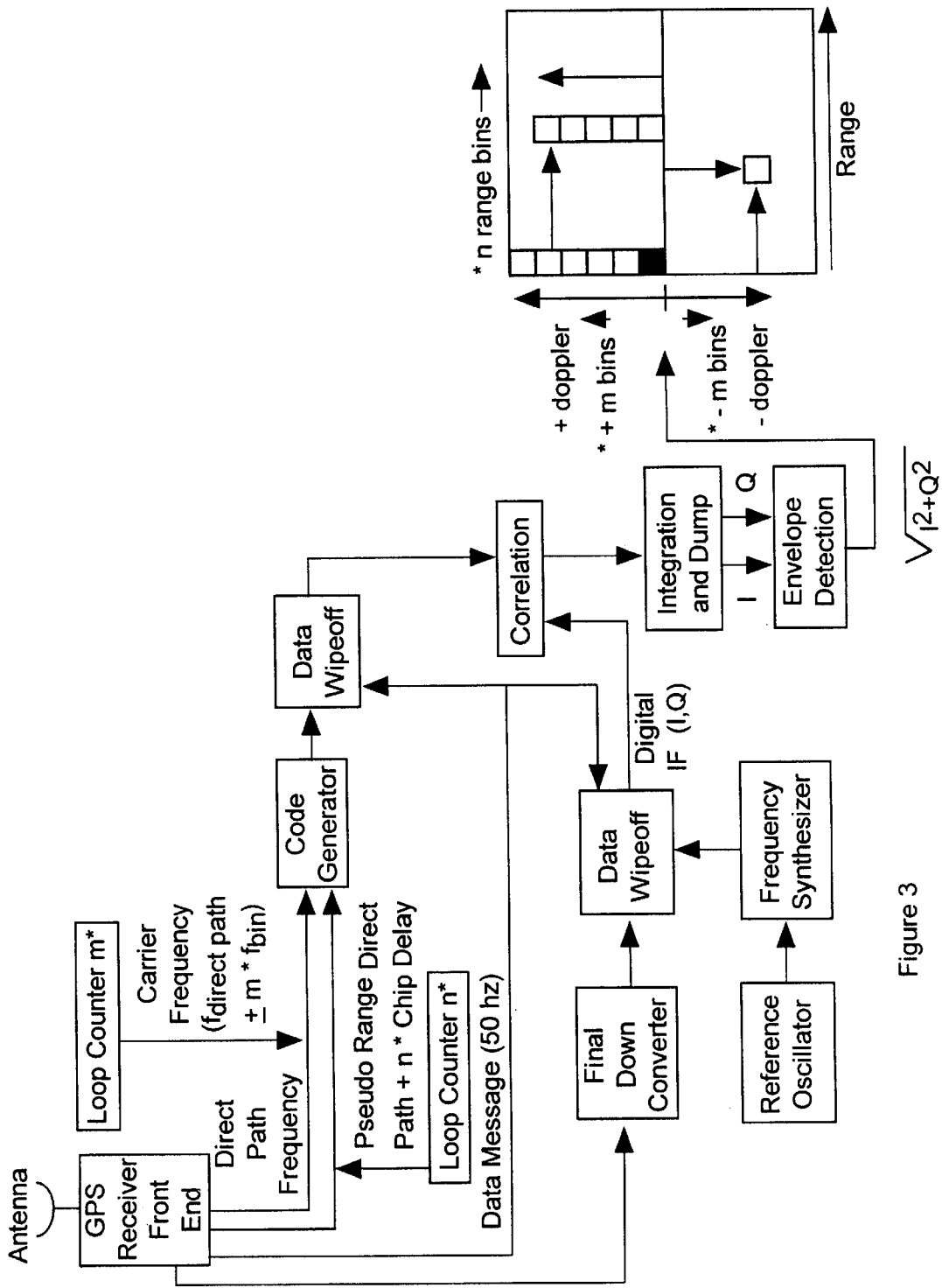
FIG. 3 illustrates a block diagram of one embodiment of the modified GPS/GLONASS receiver, or conversely, a device for augmentation of a standard GPS/GLONASS receiver in order to allow target search.

As discussed earlier, it is necessary to provide relatively long integration times in order to boost the PRN signal, and reduce noise, of target returns in the receiver. A block diagram of one embodiment is shown in FIG. 3. This diagram shows one method of providing a target search. This search is carried out by utilizing a priori knowledge of a GPS direct path signal obtained by a standard GPS receiver (either stand alone with an interface, or contained within the embodiment). It is assumed that a GPS direct path signal will have been acquired and under track for a relatively long time (approximately 12.5 minutes) before a target search is attempted. This insures that the entire GPS message (about 1023 bits transmitted at about 50 Hz) is received and stored in memory of the receiver. Parameters needed from the direct path signal include pseudo-range and carrier frequency, as well as a full data message (used for data wipeoff due to integration times longer then 20 milliseconds). This information is used to establish a baseline frequency around which chip delay and carrier frequency excursions of a reflected signal from a target will take place.

Figure 4:
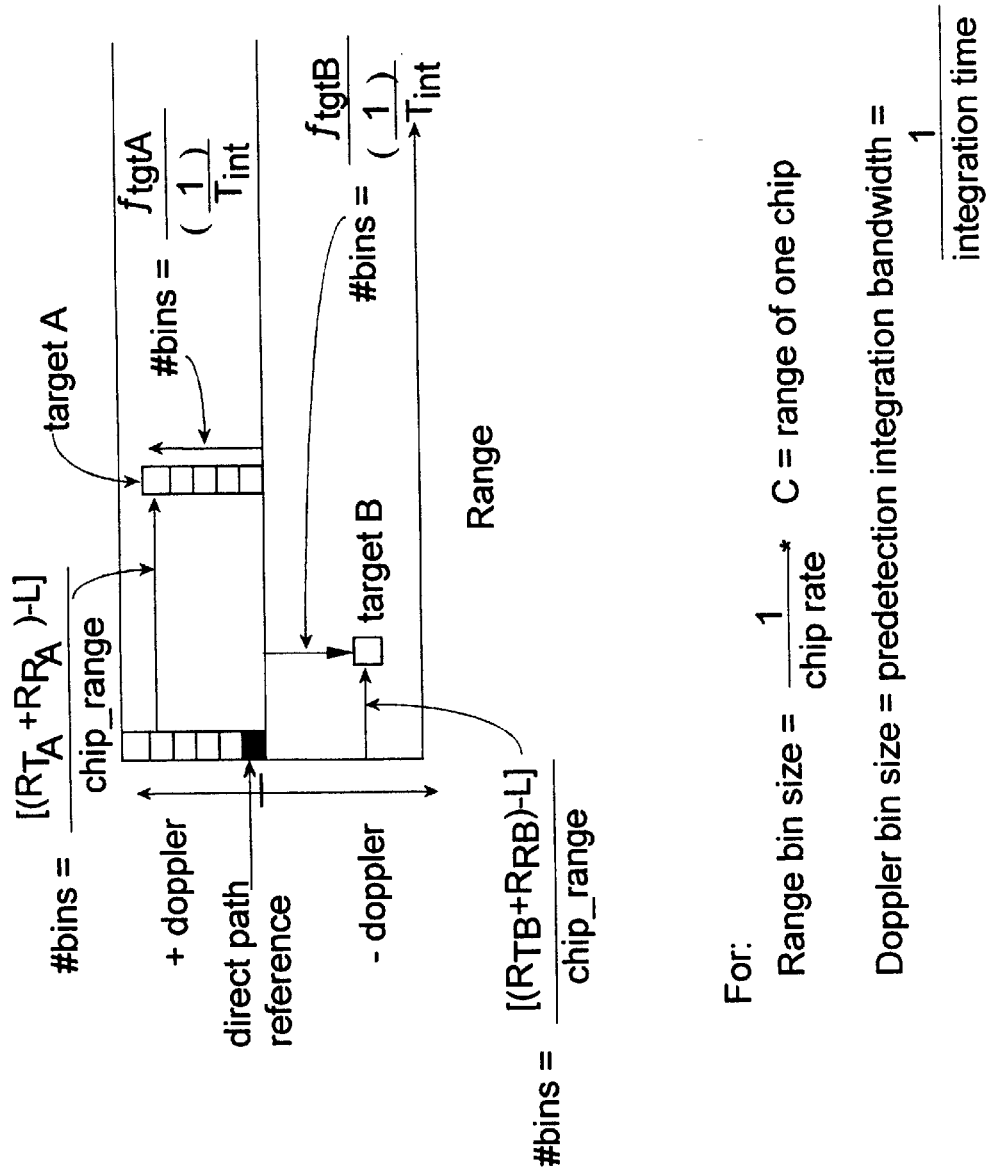
FIG. 4 presents a more detailed view of the range/Doppler target search matrix of the instant invention.

The search is carried out by correlating carrier and PRN signals received by the GPS receiver (down shifted in frequency to IF or baseband I and Q), which contains carrier and PRN signals from a direct path to the satellite and indirect path, reflected carrier and PRN signals from a target, with a frequency shifted and delayed replica of the expected satellite carrier and PRN code. Here, frequency of the carrier frequency of the replica code may be shifted in increments of Doppler bandwidth proportional to the reciprocal of the coherent integration period through a range of frequencies representative of Doppler shift of a target, the range being inclusive of anticipated speed, both toward and away from the receiver. Likewise, the replica PRN code is shifted in time increments, which may be approximately 1 millisecond, (1 C/A chip period) to establish a delay the reflected path takes to reach the receiver after being reflected from the target. Once the Doppler shift of the carrier frequency and delay of the PRN signal reflected from the target are known, as by correlating the reflected signals with direct path signals, both distance from the receiver (range-sum) and speed of the target relative to the receiver may be calculated. For example, if zero frequency shift or time delay is introduced, a correlation peak will correspond to a direct path signal from the satellite (shown in the darkened range/Doppler bin in FIGS. 3 and 4). Excursions around this point then relate directly to time delays of the PRN sequence and frequency shifts of the carrier frequency with respect to corresponding components in the direct path signal. In this way, a homodyne-like receiver is implemented, the advantage of which is that the carrier signal frequency shin being examined will directly correspond to the Doppler shift of the target only (not including transmitter Doppler due to satellite motion, or Doppler due to receiver platform motion), and the time delay of the PRN sequence will be due to multipath distances (range-sums) greater than that of the direct path. In other words, multipath time delay of the PRN sequence will correspond to range-sum distance minus direct path distance. The entire range/Doppler matrix includes a peak or peaks of correlation/correlations between the received PRN signal and carrier frequency and time/frequency shifts of the shifted replica carrier frequency and PRN signal. Memory cells of the range/Doppler search matrix are arranged, in this example, so that Doppler increments of the carrier frequency are in a vertical orientation with each cell being about 50 Hz or so tall. This size of memory cell corresponds to a speed indication of about 5 meters/second, with the aforementioned increments of the Doppler shift of the replica carrier signal falling about in the center of the frequency range of each memory cell. Likewise, the incremental time delays of the replica PRN signal may correspond generally to width of each memory cell and fall in the center thereof, with this delay shift being totaled in horizontally arranged memory cells. Thus, position of a correlation peak in the matrix of FIGS. 3 and 4 is indicative of range and speed of a target relative to the receiver. Memory cells of the range/Doppler matrix are filled by looping over frequency and time offsets in the code generator and correlating these with an integrated received signal, with those memory locations containing correlation peaks being flagged or otherwise identified as indicating target information.

The receiver embodiment shown in FIG. 3 is simply a hardware embodiment for filling the above described range/Doppler matrix. Range/Doppler matrix data elements are found by correlating PRN and carrier excursion of replica signals with corresponding received signals. For each satellite, a standard GPS receiver acquires and locks onto the direct path signal. This lock includes maintaining track of the carrier frequency and direct path pseudorange by maintaining track of position in the GPS PRN sequence of the received signal. In the instant invention, a standard GPS receiver is assumed to have had a tracked satellite under track for a period of time (approximately 12.5 minutes) sufficient to allow the entire content of the 50 Hz data message to be received and stored in memory. Having the entire data message content allows the GPS PRN sequence to be integrated for periods of time longer than the typical 20 milliseconds (or 50 Hz) data message bit duration via a technique called "data wipeoff". Data wipeoff includes sign corrections to the I and Q channels across 50 Hz message bit changes. These data message bit changes that are inherent at least in GPS signals are of a simple bi-phase coding, so correction for the 180 degree phase shift induced by data message bit changes will allow continuation of coherent integration for intervals longer than those occupied by single data message bits (i.e. 20 milliseconds).

Receiving one output from the standard GPS receiver in FIG. 3 which as stated receives the direct path signal, the front end RF hardware (pre-amp and downconverter) as well as carrier frequency synthesizer and PRN code generator are implemented. It should be noted that the preamp shown in FIG. 3 could equally well be configured just after the antenna, before the signal is split rather than after the signal split. These functions may be carried out utilizing standard GPS microchips, for instance those manufactured by Plessey microwave for the prototyping of original equipment manufacturer (OEM) receivers. In the embodiment illustrated in FIG. 3, these microchips are used to downconvert the signal from the antenna. This process includes tuning a carrier frequency synthesizer to the desired frequency and mixing with the received signal. In this embodiment, it is anticipated that the carrier frequency synthesizer will be tuned such that the frequency to be extracted from the received signal will be looped over excursions around the baseline direct-path carrier frequency (as obtained from the standard GPS receiver). This is represented by loop counter m in FIG. 3. Here, the replicated carrier frequency provided by the code generator is incrementally shifted through the Doppler range provided by the maximum extents of the memory matrix, with loop counter m maintaining a count of the number of shifts so as to determine into which memory location to place the correlated data. Size of these excursions (i.e. the Doppler bin size in the range/Doppler matrix) is simply frequency excursion steps used in the frequency synthesizer, and may be 50 Hz or so. After downconversion and formation of the inphase (I) and quadrature (Q) signal components, data wipeoff (correction of the I and Q channels for phase changes due to message data bit changes) is performed. The code generator is then used to produce PRN sequence replicas of the received satellite PRN sequence signals, the replicated signals incrementally delayed in time by a specified code delay. Correlation of the received indirect path PRN sequence with these time delayed replicas fills the range dimensions of the range/Doppler search matrix. In a search mode, the replica carrier frequency signal is repeatedly incremented upward and downward in frequency through the range of Doppler frequencies detectable, as determined by the maximum spread of Doppler memory bins. Similarly, the replica PRN signal is incremented in time through the maximum number of time-delay shifted memory bins. As stated, where correlations are found between the replicated signals and the satellite signals which as stated contains both direct path signals and reflected signals, the amount of Doppler shift in the replicated carrier frequency and time shift in the replicated PRN sequence is indicated m the appropriate coordinate of the memory matrix.

For simplicity, FIG. 4 illustrates a case where each successive replica PRN delay is equal to a single chip interval. Chip delay intervals, or range bin sizes, could in fact be made longer or shorter than a single chip interval. After each correlation of the respective carrier frequencies at a particular Doppler excursion, the resulting I and Q is combined and placed in the proper memory cell corresponding to a given range/Doppler matrix element.

A range/Doppler matrix is shown in more detail in FIG. 4. Size of range and Doppler bins may be defined at arbitrary levels, with a larger array producing a finer resolution, but requiring correspondingly greater processing requirements. In FIG. 4, range or time bins are set to one chip length (approximately 300 m for the C/A code, or 30 m for the P code), and the frequency bins are set to the pre-detection bandwidth (approximately the reciprocal of the integration time). This means that a longer integration time will result in a larger number of Doppler bins for a given Doppler bandwidth. Total Doppler bandwidth is determined by a maximum expected target Doppler spread, in turn dependent on a maximum expected target velocity. Maximum range will be determined by expected detection range for expected target RCS. For example, if it is desired to use the GPS code to search an approximately 60 km radius around a receiver, 200 range bins would be required if each range bin was a single chip delay. Similarly, if a target is expected to travel no faster that about 250 m/s (plus or minus 2500 Hz at L1), then for integration times of 0.1 seconds, Doppler bins (each of 10 Hz) would number around 500. For this situation, it is required that 200 range bins and 500 Doppler bins be searched each frame interval. Each range/Doppler bin requires a complex multiplication and a complex addition for each bit in the length of code being integrated. For example, if integration time is 0.1 seconds and the C/A code is used, there are 1023 bits/ms for the C/A code, meaning a total number of bits of 102,300 for 0.1 seconds of integration. Therefore, each Doppler bin would require 102,300 complex multiplications and additions to be calculated, with a total of 200×500, or 100,000 bins to be calculated. Thus, range/Doppler search processes can become processor intensive. However, range/Doppler search processes are highly adaptable to parallel processing in that separate parts of the range/Doppler matrix may be filled simultaneously. Accordingly, parallel paths of digital correlators may be used in receiver implementation, or acousto-optic correlators may be used. The processing problem is analogous to that encountered in standard GPS receivers if a fast 'cold start' is required, and as such, many solutions have been presented. In a 1993 paper by Bazzi et. al, (A compact acousto-optic correlator for rapid GPS signal processing, 1993 Ultrasonics symposium, which is incorporated herein by reference) the use of an acousto-optic (AO) correlator for fast acquisition of the C/A code is discussed. The acousto-optic correlator in this reference was capable of performing a full 1023 point correlation (1023 range bins in the matrix) in 25 microseconds. Special hardware was postulated to compress the 1.023 micro second C/A code into the 25 microsecond AO aperture.

Figure 5:
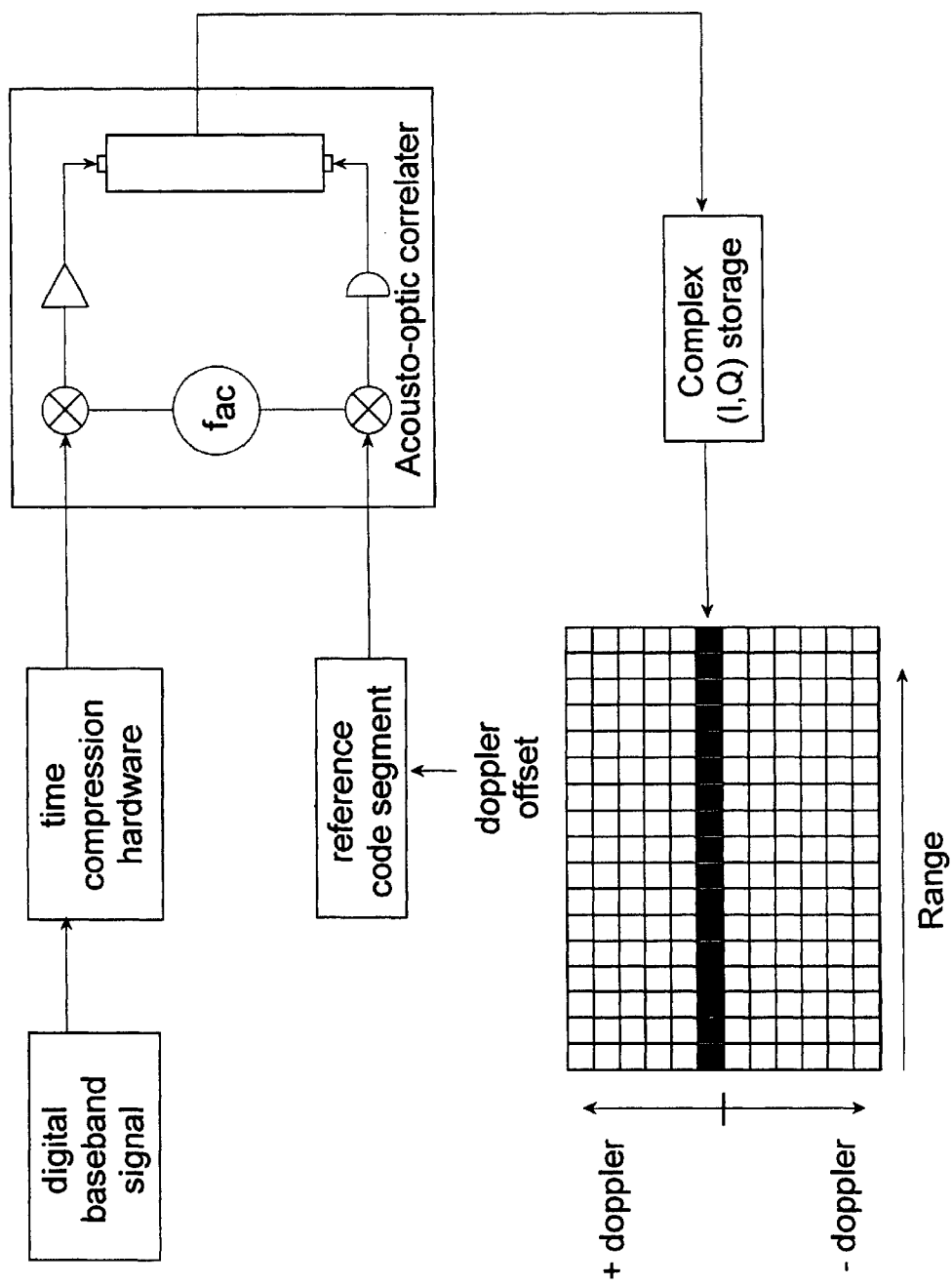
FIG. 5 presents one possible hardware implementation of the range/Doppler target search using an acousto-optic correlator.

FIG. 5 shows a block diagram of an embodiment of the invention using an AO correlator as one possible means of providing the processing power necessary to provide timely range/Doppler search. In this embodiment, an entire row, or 1023 range bins, could be calculated in the aforementioned 25 microsecond interval. When parallel implementations of these rows are constructed to operate on several Doppler shift offsets simultaneously, processing times become reasonable.

Once a full range/Doppler area of interest has been searched, detection is made based upon thresholding data in the bins (a full discussion was given previously of the detection range considerations). One embodiment of the present invention includes each receiver/device periodically performing a range/Doppler search as previously discussed, thresholding the array for detections, and fusing the detections from several arrays (from differing receivers or from the same receiver but from a different satellite transmitter) and providing target three dimensional coordinates. Another embodiment may provide for dedicated track channels utilizing phase or frequency lock loops for Doppler frequency track, and early/prompt/late correlation estimators for time delay (i.e. range-sum–direct path distance) track. Once a range/Doppler bin exceeds a detection threshold, a track channel is dedicated to this target. Dedicated track channels allow more accurate estimation of target range/Doppler, while perhaps relieving some processing requirements by allowing longer search frame times. Track mechanisms could operate in an exactly analogous manner to those used to track a direct path GPS signal in a standard GPS receiver, except in the embodiments of the present invention a signal under track is a multipath signal. Potential phase distortion possibly presented by multiple scatterers of a large, complex target could conceivably reduce SNR. However, use of standard radar techniques such as adaptive equalization (see Skolnik 20–34, 20–35) may be employed to reduce or eliminate this problem.

Figure 6:
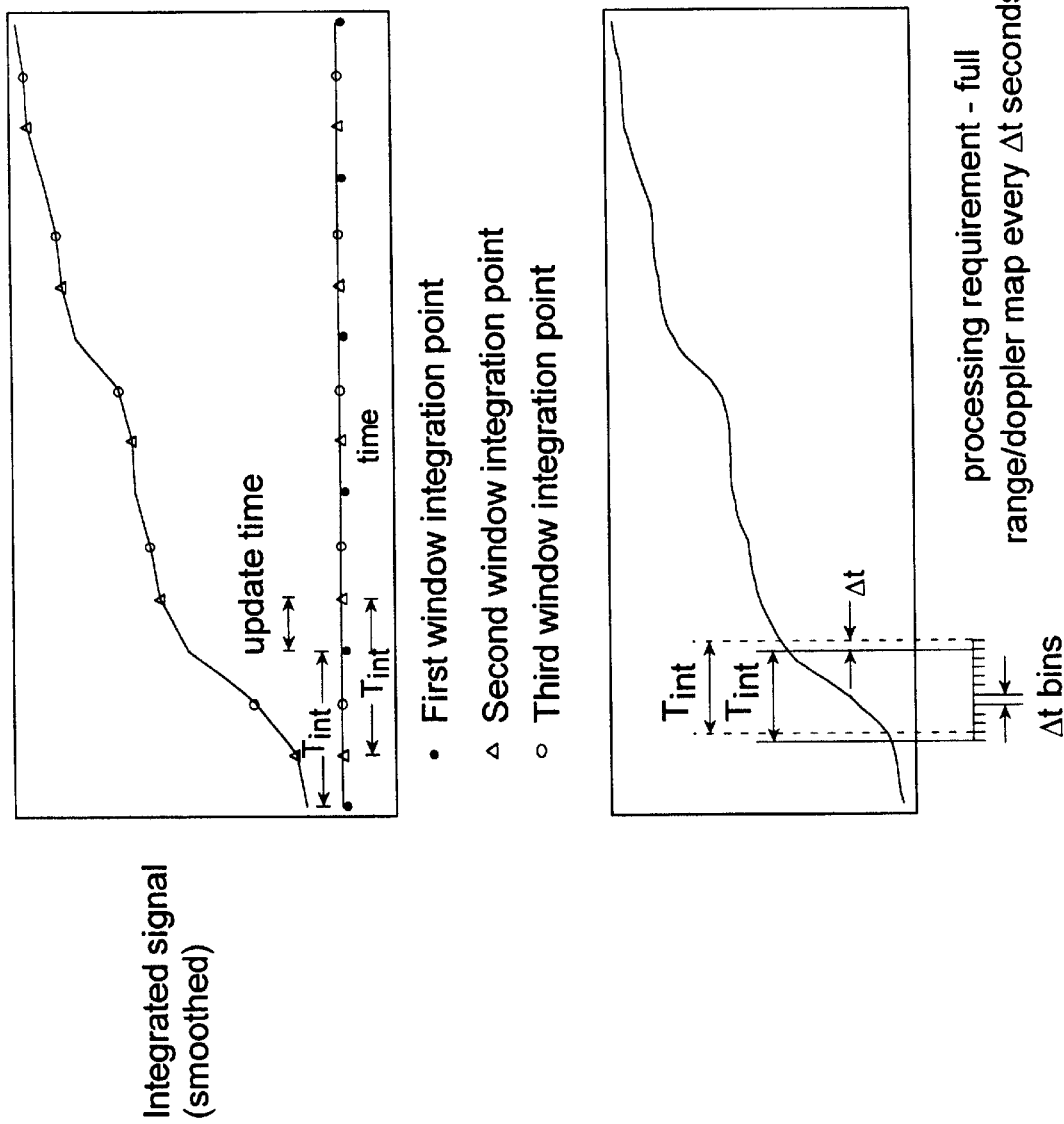
FIG. 6 shows a sliding integration window method of providing long integration times with relatively short update intervals.

In order to perform target range-sum and Doppler updates at shorter intervals while maintaining sufficient integration time to allow adequate SNR, use of a sliding integration window such as that shown in FIG. 6 may be used. The integration window includes a given number of memory locations each containing a result of a complex signal integration of a major cycle interval. In the present invention, a 20 ms major cycle interval is a longest time interval which would allow coherent integration without phase correction given a 50 Hz data message superimposed upon the GPS PRN code.

The integration window includes a plurality of these memory locations which function as a shift register wherein the most recent 20 ms interval signal integration is added to the right- most memory register, with all other memory locations being shifted one position to the left, with the leftmost memory location representing the oldest 20 ms integration interval being overwritten. The total integrated signal in the shift register at any point in time represents the coherent sum of all the memory locations within the current sliding window (shift register). For example, if an integration interval of 500 ms is required for adequate SNR, then the sliding integration window would consist of 25 memory locations, each holding a complex sum of a 20 ms signal integration. The total integrated signal (over 500 ms) would then be determined by the coherent sum (with the appropriate I and Q corrections for data message phase shifts between 20 ms intervals) of each of the memory locations. So although the total integration time would be 500 ms in this example, a modified signal update could be output every 20 ms representing modification of a current total integrated signal by addition of the most recent major cycle interval signal in combination with deletion of an oldest major cycle interval signal contribution. In the instance where the military version P(Y) of GPS is used as described above, both resolution and processing gain are increased by an order of magnitude (10×) due to higher frequencies and other properties of the P(Y) code.

Thus far it has been shown how the present invention allows reception of target observables (range-sum and Doppler) resulting from an individual receiver/transmitter/target combination. The total concept of the present invention involves not only hardware and software necessary to obtain the range-sum and Doppler observables, but also total deployment architecture allowing extraction of three dimensional target coordinates from these individual range-sum and Doppler observations.

Figure 7:
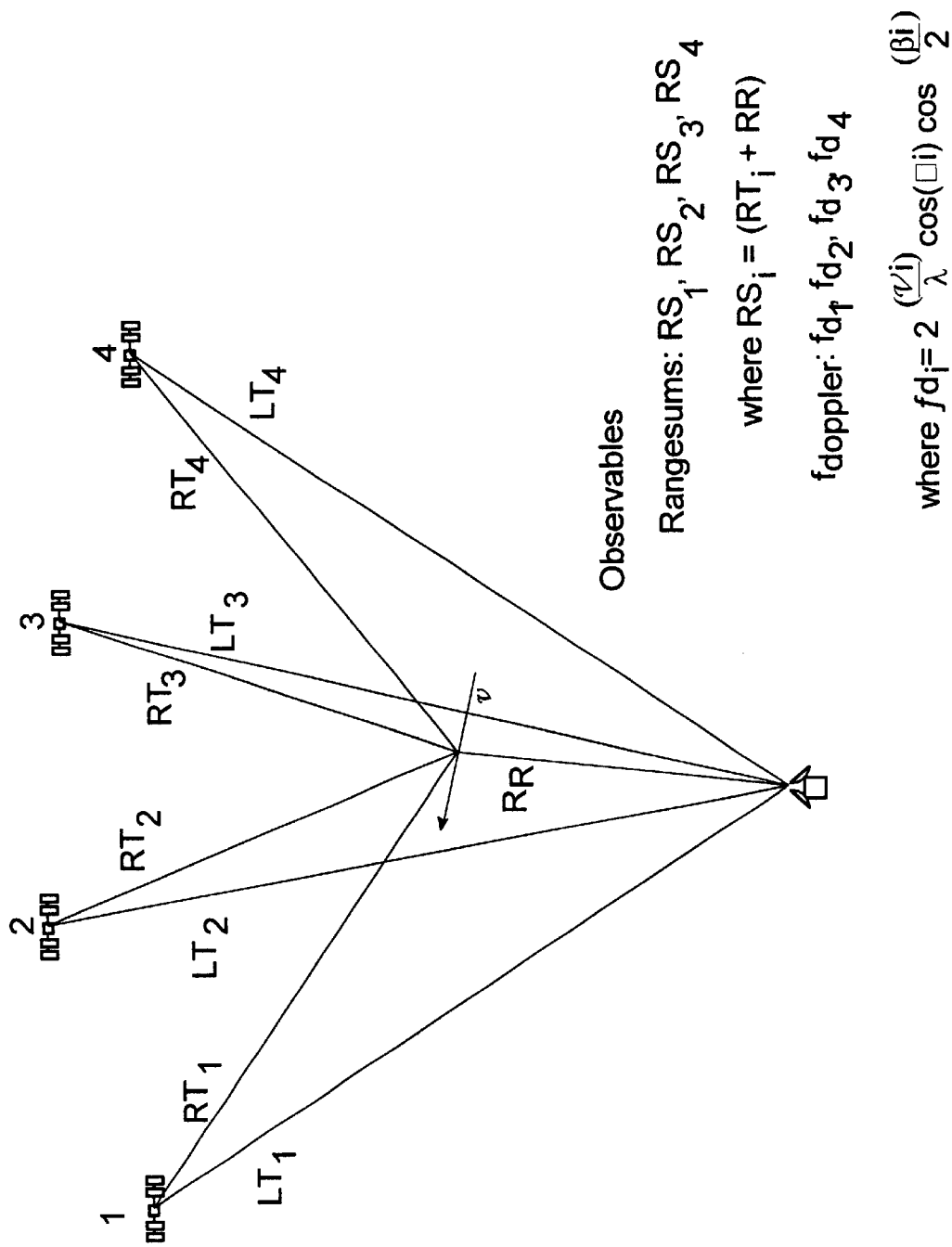
FIG. 7 shows an embodiment of a single ground based receiver utilizing several GPS/GLONASS satellite transmitters.

FIG. 7 shows use of a single modified receiver in combination with several GPS satellite transmitters. In this case, the use of three range-sums or four bistatic Doppler's will allow the unambiguous determination of the three dimensional location of a single target. The use of both will allow redundant information which can be used for target ambiguity resolution in a multitarget environment. The equations/algorithms (Skolnik, "Radar Handbook", 1970) necessary to solve for the target [x,y,z] coordinates are also shown in the figure.

Figure 8:
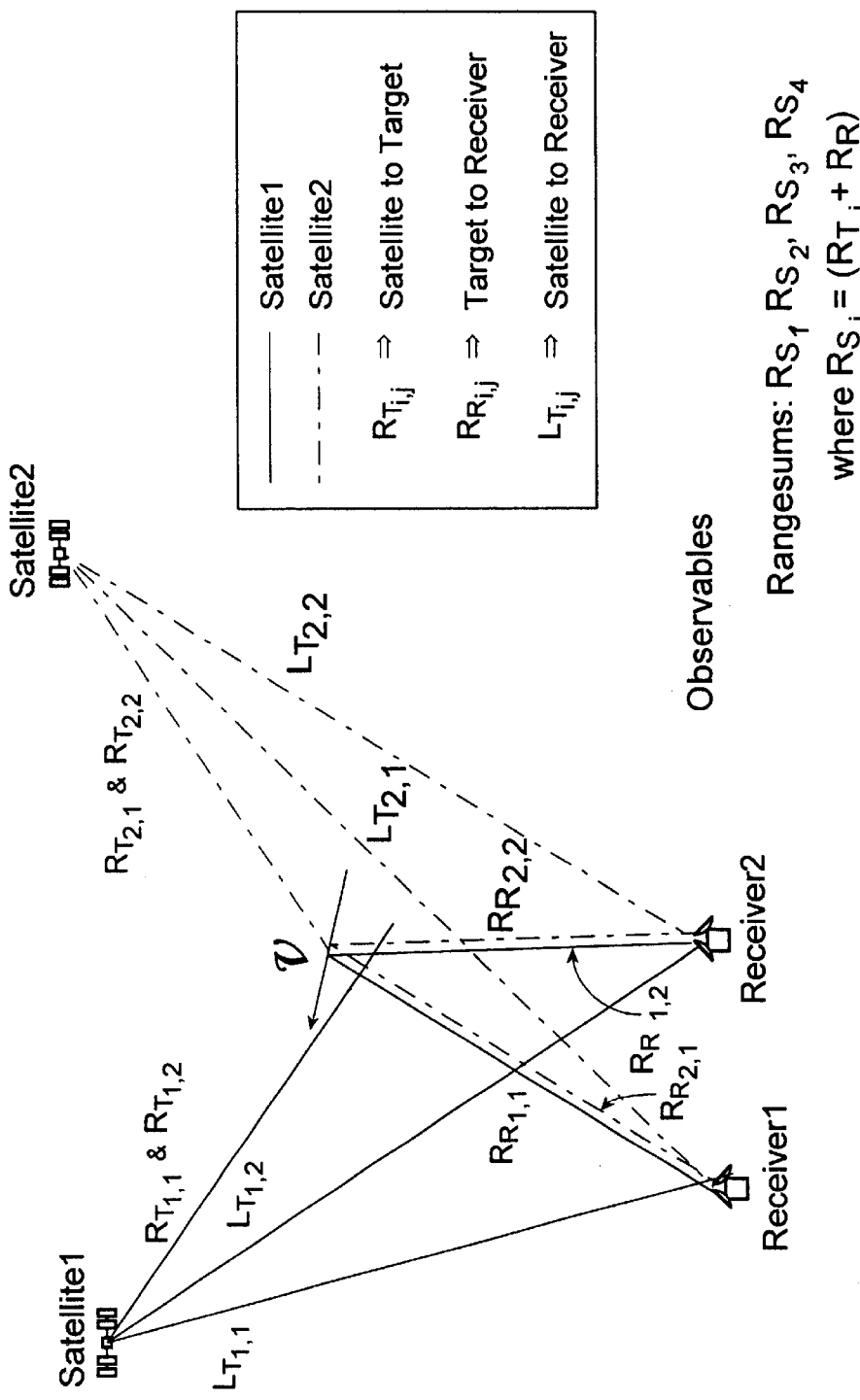
FIG. 8 shows an embodiment of several ground based receivers utilizing several GPS/GLONASS satellite transmitters.

FIG. 8 shows a scheme in which several receivers and several satellite transmitters are utilized to provide tracking information. In addition to the range-sum and Doppler observables, this embodiment may also provide range-difference metrics. Therefore, more flexibility (and greater redundancy) is provided in this multiple site configuration. It should be noted that no angle information is needed either for solution of these equations or for providing adequate SNR for targets of interest in the embodiments of FIGS. 7 or 8. While these embodiments as shown do not require directional antenna, such high gain antennae may be used to provide greater SNR and to provide further redundancy in target information by allowing angular information to be used in the computation of target coordinates. However, use of the aforementioned integration methodology without use of angle of arrival information results in the entire 2Π steradians being searched simultaneously, reducing complexity inherent in a scanning antenna system as well as providing a much higher probability of successfully acquiring targets than for standard antenna scanning techniques that are inherently constrained by time/power considerations. Use of angular information in calculation of target coordinates are presented in additional target location equations shown in the remainder of the figures.

Figure 9:
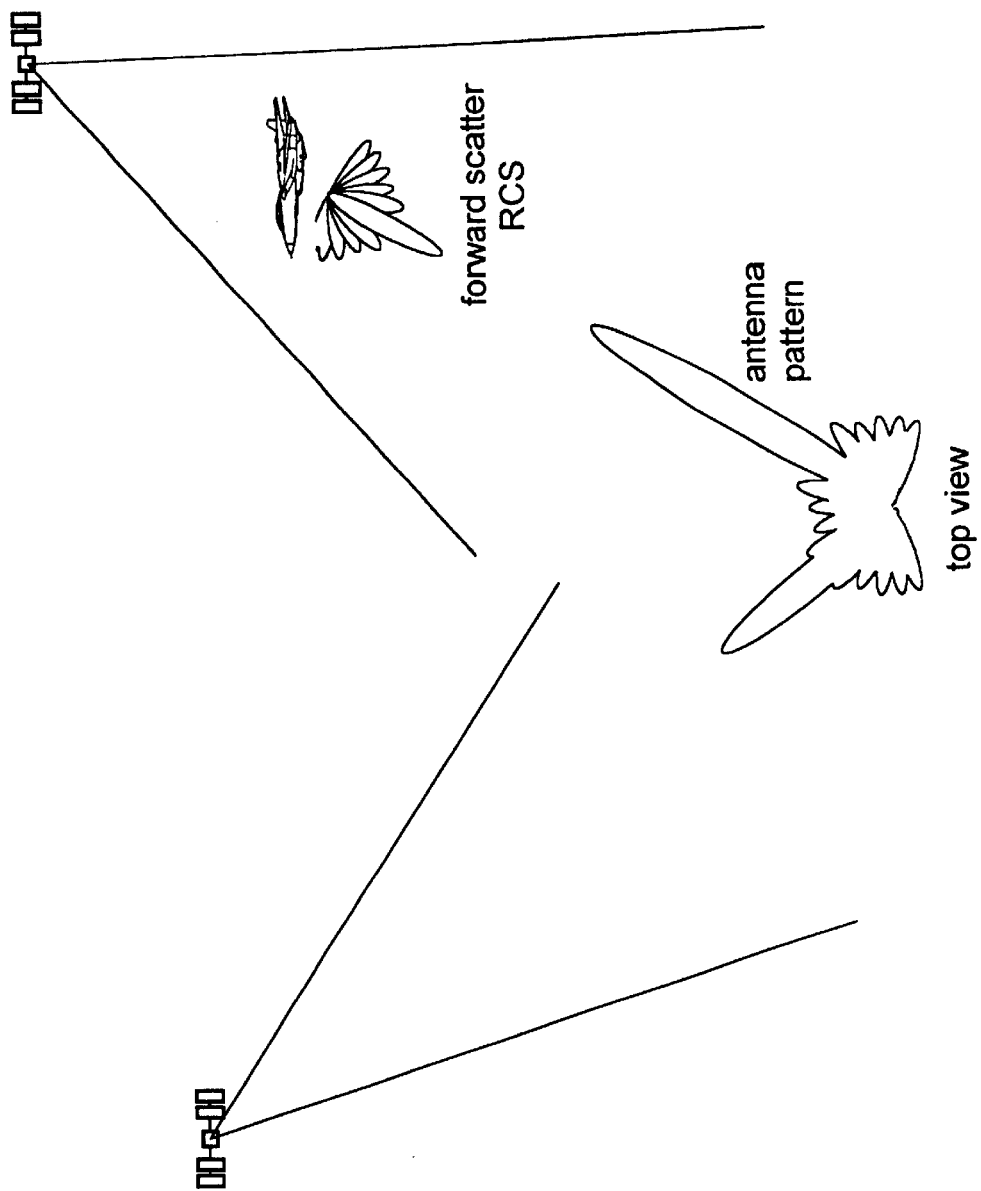
FIG. 9 shows an embodiment of a forward scatter fence using directional antennae which track several low elevation GPS/GLONASS satellite transmitters.

FIG. 9 shows a simple forward scatter fence embodiment. In this case a directional antenna (in which the antenna pattern is tracked to GPS satellite motion) is used to provide maximum gain, and therefore detection range against targets. While this embodiment provides only a basic target cueing rather than a three dimensional track capability, this embodiment will potentially allow long range cueing of ingress of very small monostatic RCS targets due to its forward scatter geometry.

Figure 10:
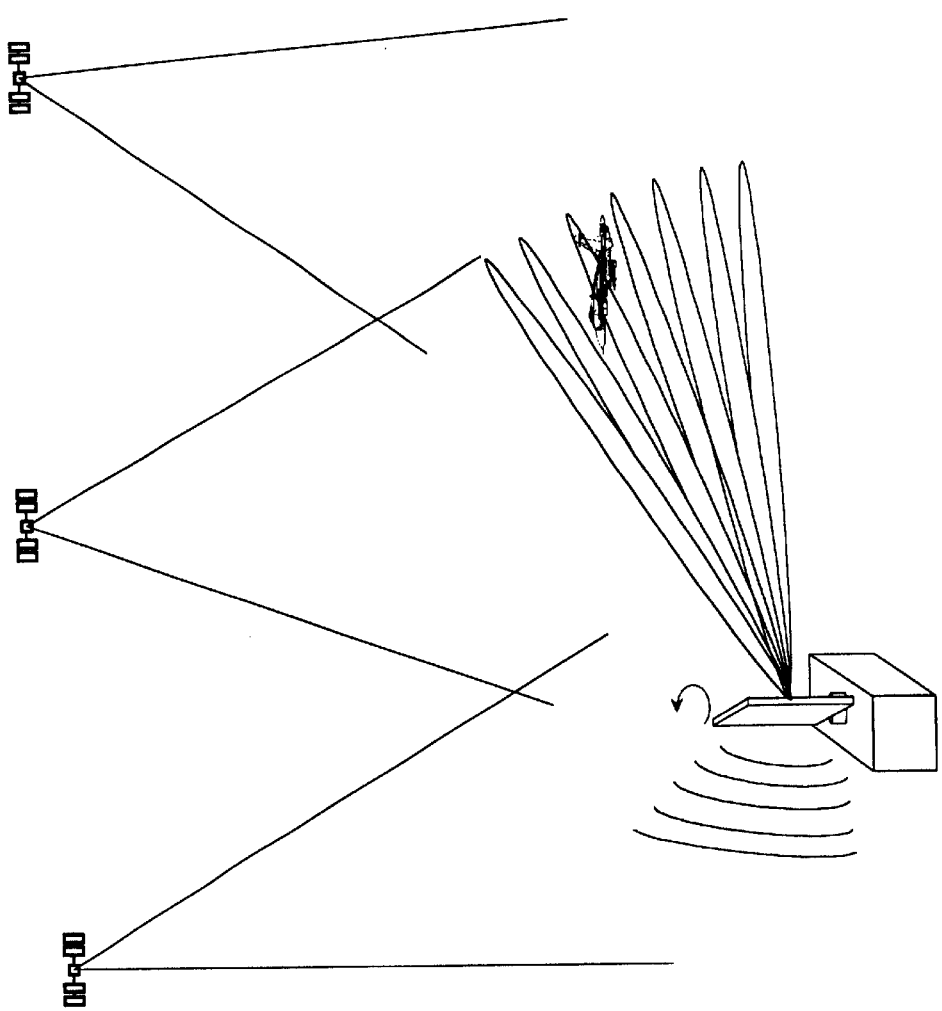
FIG. 10 shows a single ground based site utilizing directional antennae to provide added gain, and target angle of arrival information for track ambiguity resolution.

FIG. 10 shows an embodiment wherein a passive capability is retrofitted onto a conventional mechanically scanned monostatic radar. In this case, either low gain, or multiple high gain (or multiple beam electronically scanned) antenna may be used for a passive search. If high gain antenna, perhaps equipped with monopulse capability are utilized, then target angular location information is collected in addition to range-sum and Doppler. This data can be used in addition to, or instead of, range-sum and Doppler information for target coordinate location by use of various location equations shown in the figure. In this configuration, target location can be determined by a single site. It should be noted that 'target' can be defined as such diverse objects as aircraft, missiles, or even scattering by airborne ice or water droplets as in a meteorological Doppler radar.

Figure 11:
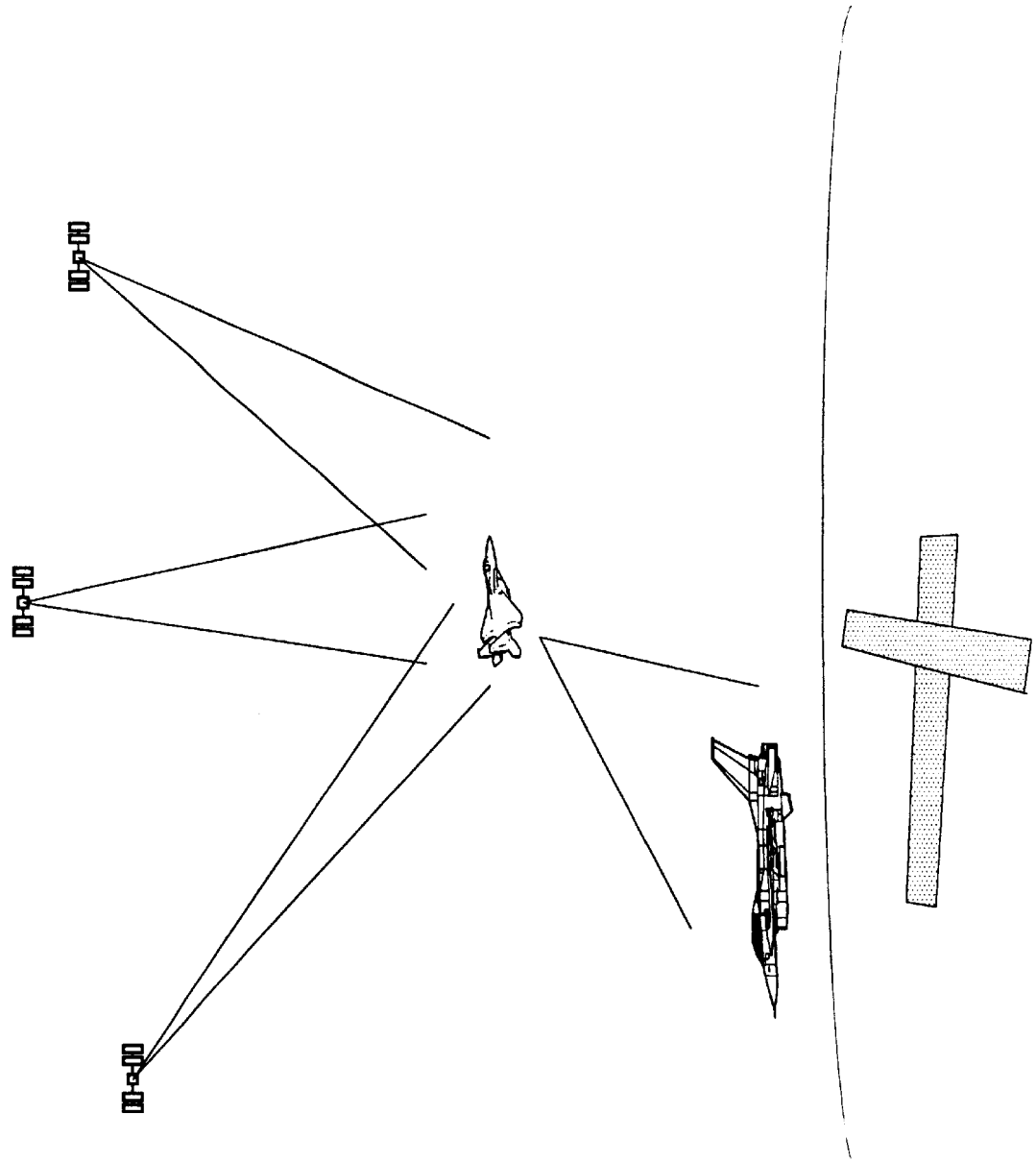
FIG. 11 shows an embodiment of an airborne receiver for aircraft situational awareness/collision avoidance.
Figure 12:
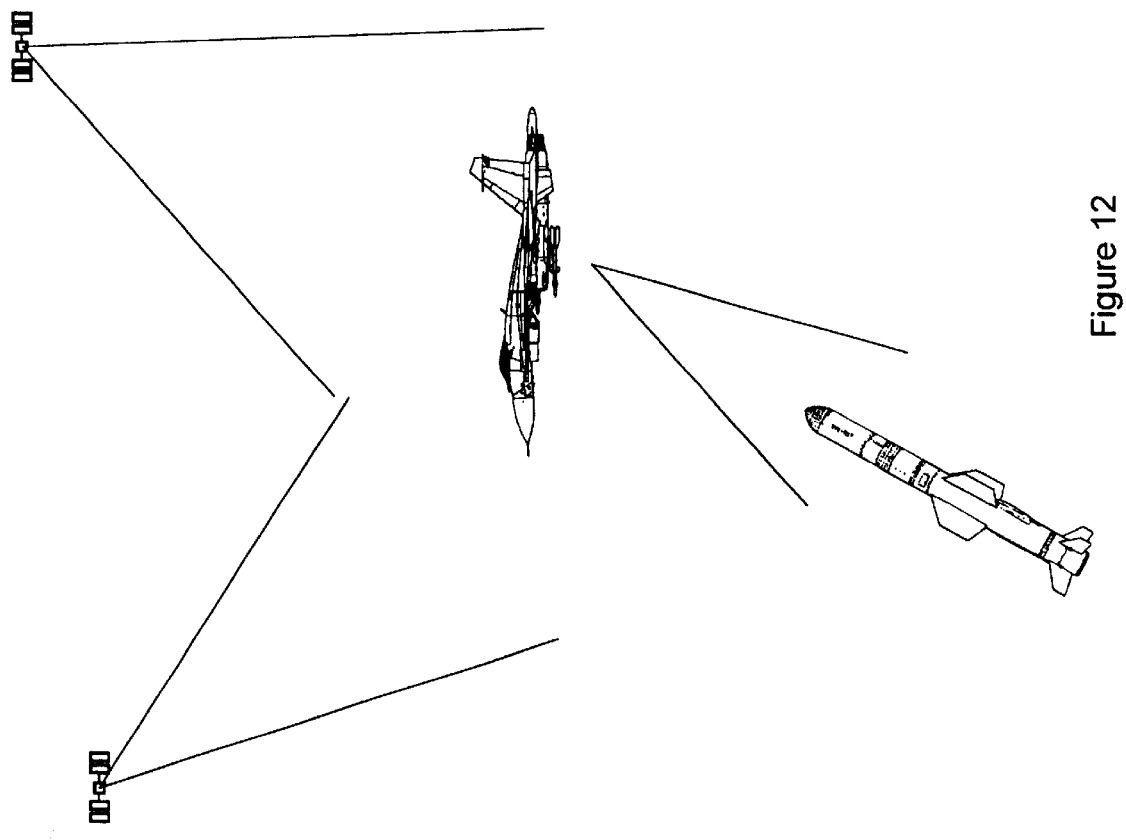
FIG. 12 shows an embodiment of the present invention as used for a passive bistatic missile seeker.
Figure 13:
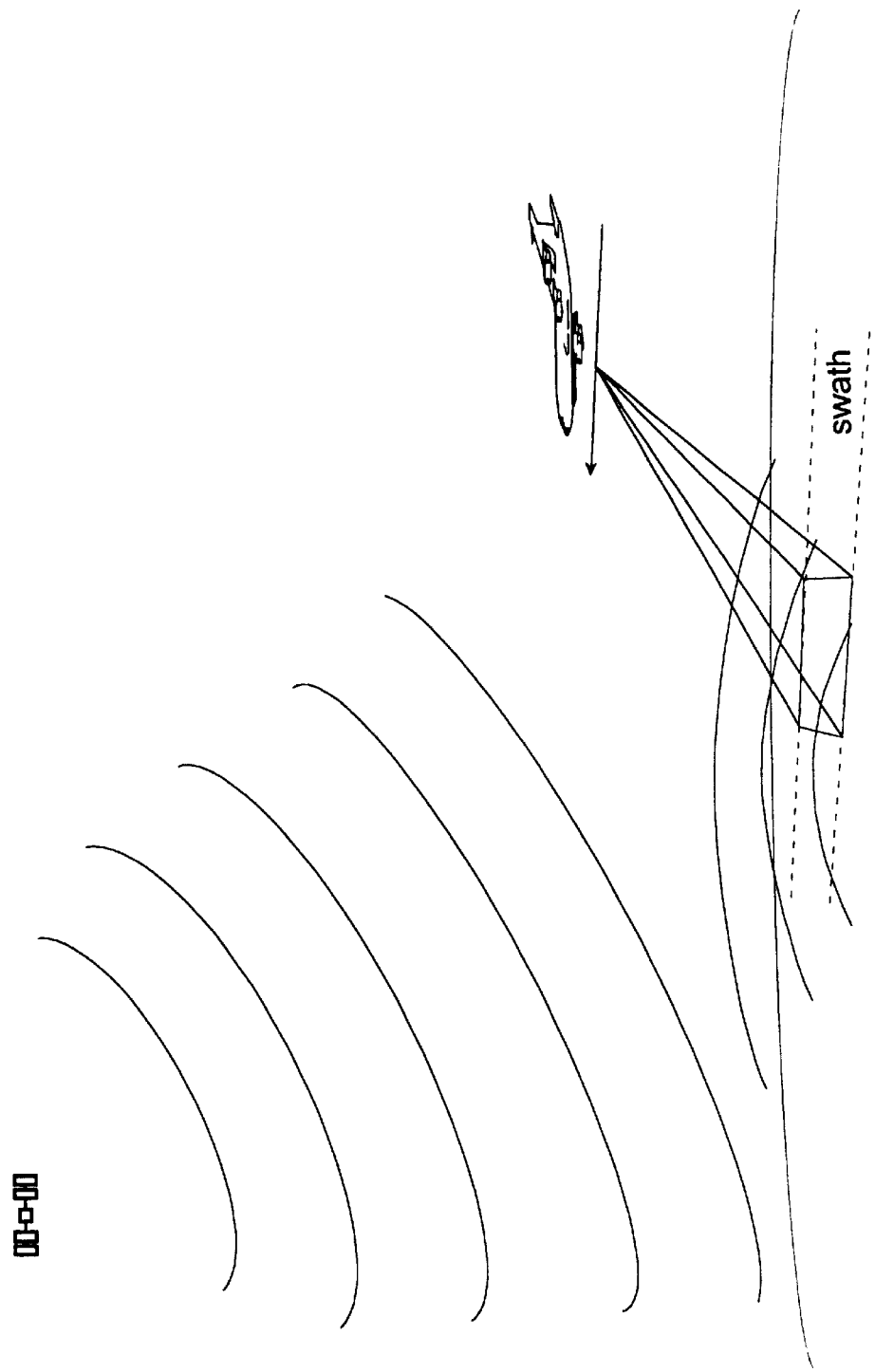
FIG. 13 shows use of the present invention in an air-to-ground role as either a radar altimeter, a passive, bistatic, SAR, or a passive, bistatic MTI.

FIGS. 11 through 13 illustrate embodiments of the present invention that need not be limited to ground to air surveillance. FIG. 11 shows schematically use of the present invention on an airborne platform for situational awareness/collision avoidance. Either directional (scanning) or isotropic antenna (nonscanning) may be used. In either case, receiver hardware/software as well as location algorithms are identical to that used in the groundbased case. FIG. 12 shows an embodiment of the invention in which the invention is mounted as the seeker onboard a missile. In this case, the missile is guided to the target by using the same hardware/software and location algorithms to provide track of the target as shown and described in the other embodiments of the present invention.

FIG. 13 shows an air-to-ground embodiment of the invention. Here, this embodiment may be as simple as taking a measurement of range to the ground (obstacle avoidance), or with further processing, may be used as a passive bistatic Synthetic Aperture Radar (SAR) which functions to image terrain bistatic scattering characteristics. This same embodiment, with a change in receiver aircraft velocity vector with respect to the satellite ground track, may be used to provide Moving Target Indication (MTI) of the ground. Both of these embodiments require further processing of the signals provided by the present invention, however, these processing techniques are well known and would still require use of the present invention in order to provide adequate signal power when using GPS signals as an illumination source of opportunity. It should be noted that use of GPS in a SAR or MTI application would be particularly applicable due to the short ranges (terrain very close to the aircraft could be imaged) which would provide higher signal levels, and high inherent stability of the GPS signal which would provide an extremely clean illumination signal for frequency/phase processing.

It should also be noted that although the discussion above centers on use of GPS or GLONASS signals, opportunistic use of other satellite signals for cueing and general surveillance is equally possible. There are several considerations which need to be addressed in terms of utilization of general digital satellite signals rather than specific satellite signals as discussed above. The basic signal processing scheme utilized for the GPS/GLONASS signals can be followed for any general satellite signal. This method relies on relatively long coherent integration times (and resultant large processing gain) along with a narrow noise bandwidth to extract low signal power levels from noise. Correlation of the sample satellite signal and a time delayed and Doppler shifted replica will work for any arbitrary signal. However, whereas the GPS/GLONASS satellite signal was initially chosen for use in the bistatic concept because it provides a very accurate determination of the time of transmit (TOT) of the signal (i.e. the time of transmit of a GPS signal is known very accurately by location of the signal in the PRN code).

Since time of reception of the signal is easily determined, the range-sum (satellite to target to receiver distance) may be directly calculated. A target's three dimensional location may be unambiguously determined from three independent range-sum measurements, whether from three independent receiver sites or a single receiver site with range-sums from three different transmitting satellites. For a general satellite signal, the TOT will not be available, and range-sums cannot be directly determined. In this case, use of the difference in time of arrival between multiple sites must be used and can be readily obtained via correlation techniques. Three or more 'range-difference' measurements are required for unambiguous determination of three dimensional target location.

Having thus described my invention and the manner of its use, it should be apparent that incidental changes may be made thereto that fairly fall within the scope of the following appended claims, wherein I claim:

1. A method for utilizing RF location signals broadcast over a wide area by at least one remote transmitter, with a receiver of said RF location signals disposed for discriminating between direct path said RF location signals and reflected said RF location signals in order to develop data relating to at least one reflective source of said reflected RF location signals, said method comprising the steps of:
   a) receiving said RF location signals from said remote transmitter,
   b) extracting from said RF location signals direct range data representative of a direct RF signal path between said remote transmitter and said receiver,
   c) from said RF location signals, developing target range data representative of an RF signal path from said remote transmitter to said reflective source and then to said receiver,
   d) comparing said direct range data and said target data to develop relational data indicative of at least one selected relationship between said receiver and said reflective source.

2. A method as set forth in claim 1 wherein said step of extracting said direct range data further comprises the steps of:
   a) extracting carrier frequency data and pseudorange data from said RF location signals,
   b) developing a replica of data used to develop said pseudorange data and said carrier frequency data,
   c) comparing said replica of data to said target range data to develop said relational data.

3. A method as set forth in claim 2 wherein said step of developing a replica of data further comprises steps of:
   a) developing a replica of said RF location signals received by said receiver directly from said transmitter,
   b) superimposing said replica over said received location signals,
   c) shifting said replica in time increments until said replica matches those said location signals reflected from a target,
   d) counting said time increments to determine length of a signal path between said target and said receiver.

4. A method as set forth in claim 1 wherein speed of said reflective source is determined by steps comprising:
   a) developing a replica of said direct range data,
   b) superimposing said replica over said direct range data,
   c) shifting frequency of said replica in discrete frequency increments until a frequency of said replica generally matches frequency of said direct range data,
   d) counting a number of said discrete frequency increments to determine speed of said target relative to said receiver.

5. A method as set forth in claim 2 wherein said step of comparing said replica of data to said target data includes steps comprising:
   a) correlating a plurality of increments of said direct range data with a like plurality of increments of said target range data to develop a plurality of correlations,
   b) integrating said plurality of correlations,
   c) storing a result of said step of integrating.

6. A method as set forth in claim 5 wherein said step of correlating further includes the step of utilizing an acousto-optic correlater to perform said step of correlating.

7. A method as set forth in claim 2 wherein said step of developing a replica of said RF location signals includes steps comprising:
   a) utilizing a location code generator to generate said replica of said location code,
   b) utilizing a first counter wherein each count thereof incrementally shifts said replica in timewise relation with said received signal,
   c) utilizing a second counter wherein each count thereof incrementally shifts said replica in frequency relation with said received signal.

8. A method as set forth in claim 1 further comprising the step of storing said relational data in a matrix of memory locations wherein position of said relational data in said matrix is indicative of speed of said reflective source relative to said receiver and distance of said reflective source from said receiver.

9. A method as set forth in claim 7 further comprising the step of storing said relational data in a matrix of memory locations wherein position of said relational data in said matrix is indicative of speed of said reflective source relative to said receiver and distance of said reflective source from said receiver, with each count of said first counter associated with a respective said memory location positioned in a time delayed relationship with respect to said direct path RF location signals, and each count of said second counter associated with a respective said memory location positioned in a frequency shifted relationship with respect to said direct path RF location signals.

10. A method as set forth in claim 1 wherein said receiver is located on an aircraft.

11. A method as set forth in claim 1 wherein said receiver is located on a missile.

* * * * *